March 7, 1939.　　　　E. A. GLYNN　　　　2,149,395

TIRE CONTRACTING TOOL

Filed March 15, 1938

INVENTOR
E. A. Glynn

BY
ATTORNEY

Patented Mar. 7, 1939

2,149,395

UNITED STATES PATENT OFFICE 2,149,395

TIRE CONTRACTING TOOL

Edwin A. Glynn, Lodi, Calif., assignor to Super Mold Corporation of California, Lodi, Calif., a corporation of California Application March 15, 1938, Serial No. 195,990

7 Claims. (Cl. 24—19)

This invention relates to the tire retreading or recapping industry, and particularly to a tool for use in placing a tire into a full circle mold for retreading, etc.

The mold matrix for a tire of a given size should have a close fit on the tire, and since the matrix has a depressed design into which the new camelback on the tire must project, it is frequently a difficult matter to place the tire into the mold. This is especially true with large tires, which resist manual efforts to distort or contract them in order to crowd them into the matrix.

It is therefore the principal object of my invention to provide a tool by means of which a tire, no matter how large, may be easily contracted so as to reduce its diameter sufficiently to readily enter the matrix.

A further object is to provide a tool for the purpose so designed as to be capable of convenient use either when the tire is on the floor or when it is resting on the mold in position where contracted to enter the same.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
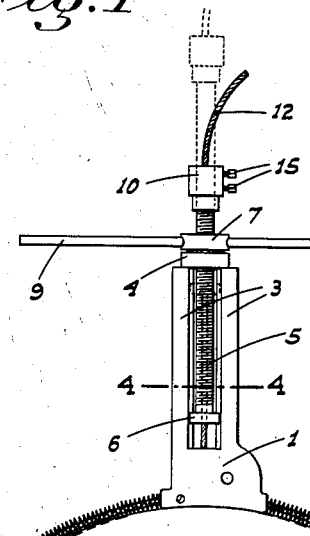
Figure 1 is an elevation showing my tool as applied to a tire.
Figure 2:
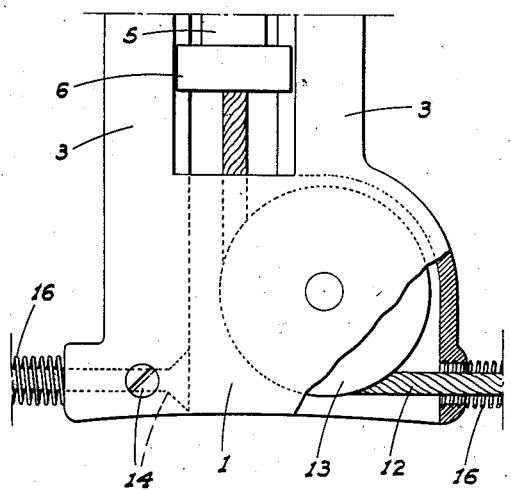
Figure 2 is an enlarged fragmentary view of the base portion of the tool.
Figure 3:
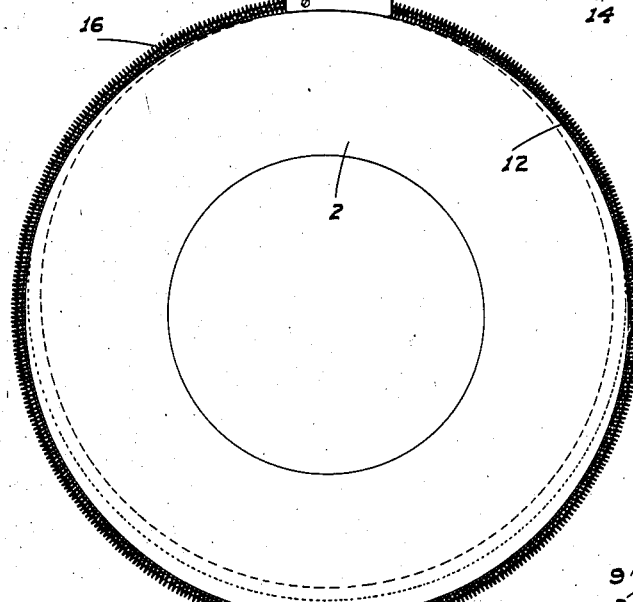
Figure 3 is a sectional elevation of the upper portion of the tool.
Figure 4:
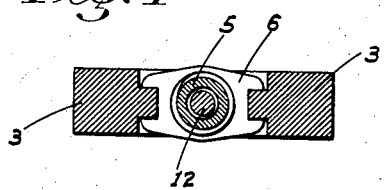
Figure 4 is a cross section on line 4—4 of Fig. 1.

Referring now more particularly to the characters of reference on the drawing, the tool comprises a rigid relatively narrow body or frame, the base portion 1 of which is hollow and which is preferably concavely curved lengthwise to substantially follow the contour of the exterior tread periphery of a tire 2. Upstanding from and rigid with the base are spaced bars 3 surmounted by a stationary thrust block 4 secured on said bars.

A tubular jack screw 5 slidably projects through the block so that it is radially of the tire, and carries a fixed cross head 6 on its inner end slidably engaging the bars to prevent rotation of the screw. A nut 7 is threaded on the screw above the block 4, balls 8 being mounted between and engaging the block and nut to provide a relatively frictionless thrust bearing. The nut is arranged to be rotated by suitable means such as radial handles 9 projecting therefrom.

The screw is surmounted by a socket member 10 in which a split bushing 11 is disposed. A flexible cable 12 projects through the bushing and the screw, and about a pulley 13 mounted in the base portion 1 on one side of the screw and tangent thereto, and forms a loop of sufficient extent to surround the tire 2 between said pulley and as an anchor or dead end connection with the base portion on the opposite side of the axial plane of the screw as at 14. The cable is rigidly but releasably gripped in the bushing by suitable means such as set screws 15.

A flexible contractible housing 16, preferably in the form of a helical spring, surrounds the loop portion of the cable and is secured at its ends to the opposite sides or ends of the base portion 1 of the body. Said ends of the housing are connected to the body as close to the curved edge as possible, so that said edge and the housing form a practically unbroken circle.

In operation, the screw is first disposed so as to be retracted between the bars 3, the bushing is loosened to release the cable, and the looped housing is placed about the tire. Any slack in the cable is then taken up by pulling the same through the bushing, and the latter is then clamped about the cable to hold the same against relative movement. The nut 7 is then rotated to advance the screw from the body, which will of course pull the cable with it and cause the circumferential extent of the loop to be shortened.

The housing due to its contractable nature is also shortened without buckling or kinking, and the contracting pressure thus placed on the tire decreases the diameter thereof to the extent necessary to enable it to fit into the mold matrix since the tire is in contact for substantially its entire circumferential extent with the contracting member of the tool, the contracting of the tire will be event throughout its extent.

Due to the narrowness of the body of the tool and especially its base portion (which is but slightly wider than the housing) and to the flexible form of the housing, said tool may be disposed radially of the tire as shown (as when the tire is already resting on the lower matrix of a horizontal mold) or it may be turned at right angles to the tire, as when the tire is resting on the floor prior to being lifted onto the mold.

The main value of the housing is that it prevents the scuffing of the rubber of the tire such as would be had if the moving end of the cable dragged directly against the rubber. The housing, made up as it is of a great number of separate turns each one of which separately engages the tire, causes the contracting movement of the housing to be distributed over practically all said turns, so that the movement of the housing at any one point of the tire is negligible.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tire contracting tool comprising a loop formed of a flexible non-elastic element to surround a tire, and means applied to the loop to alter the effective peripheral extent thereof and a housing, contractible at substantially all points in its length between its ends, disposed about the loop portion of the element.

2. A tire contracting tool comprising a body adapted at one end to engage against a tire on the exterior periphery thereof, a flexible non-elastic element forming a loop to extend about the tire, means anchoring the element at one end of the loop on the body and means mounted on the body and applied to the element at the other end of the loop to alter the peripheral extent thereof and a flexible housing contractible at substantially all points in its length between its ends, surrounding the loop portion of the element and secured against movement at both ends on the body.

3. A tire contracting tool comprising a body adapted at one end to engage against a tire on the exterior periphery thereof, a length of cable to extend about a tire, means anchoring one end of the cable on the body adjacent said end and on one side thereof, a pulley mounted in the body adjacent said end and on the opposite side thereof and about which the cable passes from the corresponding end of the loop, a jack screw mounted in the body tangent to the pulley, away from the tire engaging end of the body, means to advance the screw outwardly relative to said end of the body, and means to clamp the cable beyond the pulley to said screw.

4. A tool as in claim 3, in which the screw is tubular and the cable extends therethrough, and the cable clamping means is mounted on the screw at its outer end.

5. A tire contracting tool comprising a body adapted at one end to engage against a tire on the exterior periphery thereof, a length of cable to extend about a tire, means anchoring one end of the cable on the body adjacent said end and on one side thereof, a pulley mounted in the body adjacent said end and on the opposite side thereof and about which the cable passes from the corresponding end of the loop, a jack screw mounted in the body tangent to the pulley, away from the tire engaging end of the body, means to advance the screw outwardly relative to said end of the body, the screw being tubular and the cable projecting therethrough, and a clamping device to releasably engage the cable mounted at the outer end of the screw to prevent longitudinal movement of the cable relative to the screw.

6. A tire contracting tool comprising a body adapted at one end to engage against a tire on the exterior periphery thereof, a flexible non-elastic element forming a loop to extend about the tire, means anchoring the element at one end of the loop on the body, means mounted on the body and applied to the element at the other end of the loop to alter the peripheral extent thereof, and a flexible contractible housing about the loop portion of the element; the loop portion of the element having its inception adjacent the tire engaging end of the body, the width of the body at said end being but slightly greater than that of the housing.

7. A tool as in claim 1, in which said housing comprises a helically wound spring wire whose turns at all points are normally spaced apart.

EDWIN A. GLYNN.